United States Patent [19]

Fladby et al.

[11] Patent Number: 4,581,142

[45] Date of Patent: Apr. 8, 1986

[54] HYDROCYCLONE

[75] Inventors: Tron-Halvard Fladby, Nittedal; Leif N. Hovind, Oslo, both of Norway

[73] Assignee: Titech, Joh. H. Andresen, Oslo, Norway

[21] Appl. No.: 653,245

[22] PCT Filed: Jan. 11, 1984

[86] PCT No.: PCT/NO84/00002

§ 371 Date: Sep. 6, 1984

§ 102(e) Date: Sep. 6, 1984

[87] PCT Pub. No.: WO84/02664

PCT Pub. Date: Jul. 19, 1984

[30] Foreign Application Priority Data

Jan. 12, 1983 [NO] Norway ................................ 830085

[51] Int. Cl.4 ........................ B04C 5/04; B01D 21/26

[52] U.S. Cl. .................................. 210/512.1; 209/211

[58] Field of Search ...................... 55/15, 17, 204, 205, 55/459 R, 459 A, 459 B, 459 C, 459 D, 460; 209/144, 211; 210/512.1, 512.2

[56] References Cited

U.S. PATENT DOCUMENTS

| | | | |
|---|---|---|---|
| 2,665,808 | 1/1954 | Chisholm | 209/211 |
| 2,741,899 | 4/1956 | von Linde | 55/459 D X |
| 2,756,878 | 7/1956 | Herkenhoff | 209/211 |
| 2,793,748 | 5/1957 | Herkenhoff | 209/211 X |
| 2,816,658 | 12/1957 | Braun et al. | 209/211 |
| 2,881,126 | 4/1959 | Glinka | 209/211 X |
| 3,034,647 | 5/1962 | Giesse | 209/144 |
| 3,173,273 | 3/1965 | Fulton | 55/459 R X |
| 3,306,461 | 2/1967 | Weis | 210/512.1 |
| 3,349,548 | 10/1967 | Boyen | 55/459 A X |
| 3,613,887 | 10/1971 | Wikdahl | 209/211 |
| 3,807,142 | 4/1974 | Rich et al. | 55/204 X |
| 4,067,814 | 1/1978 | Surakka et al. | 209/211 X |
| 4,070,171 | 1/1978 | Wikdahl | 55/459 R X |
| 4,092,130 | 5/1978 | Wikdahl | 55/459 R X |

FOREIGN PATENT DOCUMENTS

| | | | |
|---|---|---|---|
| 846987 | 8/1952 | Fed. Rep. of Germany . | |
| 2333008 | 1/1974 | Fed. Rep. of Germany . | |
| 1052407 | 1/1954 | France . | |
| 1054540 | 2/1954 | France . | |
| 1518253 | 3/1968 | France . | |
| 73302 | 9/1953 | Netherlands | 55/459 R |
| 238137 | 10/1945 | Switzerland . | |
| 607787 | 9/1948 | United Kingdom . | |
| 1202296 | 8/1970 | United Kingdom . | |

*Primary Examiner*—Robert Spitzer

*Attorney, Agent, or Firm*—Morgan, Finnegan et al.

[57] ABSTRACT

A cyclone separator or hydrocyclone with good separation efficiency and large capacity comprises a substantially cylindrical or slightly conical hollow body (1), the lower part of which terminates in an outlet opening (6) for liquid enriched with respect to solid particles, and in which the outlet (7) for purified liquid is defined between a centrally arranged body (11) and a guiding tube (2), and in which the liquid to be purified is introduced via a particularly designed nozzle (13).

9 Claims, 6 Drawing Figures

HYDROCYCLONE

The present invention relates to a cyclone separator, preferably of the type used for separation of solid particles from a liquid medium. Such separators are often termed hydrocyclones.

A short account of hydrocyclones is inter alia given in the "Encyclopedia of Chemical Technology", 2nd. edition, volume 4 (pp 747–748).

Theoretically, a free vortex will exist in such a cyclone, resulting in large shear forces being developed in the sedimentation zone. Hence such cyclones are not well suited for separation of flocculated matters or solid particles which easily are broken up.

However, such cyclones are well suited for removal of fine particles at low or medium concentrations. Due to the shear forces existing in the vortex in a hydrocyclone, it is not only the centrifugal force which causes separation, but the form of the particles also exerts a certain effect. Hydrocyclones have hence been used in the wood pulp industry to cause a certain separation of fibres of different lengths.

Normally, a hydrocyclone comprises a rotatable symmetrical, elongated hollow body which under operation is arranged, vertically, and the upper part of which is provided with at least one tangential inlet through which the liquid to be treated at high velocity is introduced, the rotation of the body causing the formation of a vortex in the hydrocyclone.

In the upper part of the hydrocyclone a central opening exists, the cross-sectional area of which is larger than the total cross-sectional area of the inlet openings. Through the central upper outlet opening the injected liquid is passed and is fully or partly devoid of solid particles.

In the lowest part of the hydrocyclone there is provided a central outlet opening, the cross-sectional area of which is less than the cross-sectional area of the inlet opening which opening serves as an outlet for a minor part of the injected liquid which is enriched with respect to the solid matter.

The rotatable, symmetrical hollow body can be designed approximately conical along its entire length, as shown in U.S. Pat. No. 2,920,761, or be designed with a cylindrical upper part and a conical lower part, as shown in Norwegian Patent No. 144 128. In order to adapt hydrocyclones to different purposes, and in order to improve their efficiency, several modifications of hydrocyclones have been proposed. For instance, they may be modified with respect to the inlet for the liquid to be treated, as shown in the above-mentioned Norwegian patent, or by modifying the outlet for the liquid portion enriched with solid matter, as shown in U.S. Pat. No. 4,309,238.

Special designs for the outlet for the accept liquid are shown in U.S. Pat. No. 4,259,180 and French Patent No. 1,518,253.

Different variations of hydrocyclones are mentioned in the U.S. Pat. Nos. 4,265,470, 4,280,902, 4,305,825 and 4,267,048, as well as in U.S. Pat. No. 4,272,260, which deals with a cyclone for separation of solid particles from gases. Common features of known cyclone separators and hydrocyclones, as described in the above-mentioned patents, are that the outlet for the accept liquid consists of a central tube and the outlet opening is normally positioned below the level of the injected liquid.

In order that the liquid shall be able to flow through the central outlet as an overflow, a substantial part of the volume of the cyclone will be occupied by rotating liquid layers. Due to the turning tendency at the lower conical inner wall of the hydrocyclone, turbulence will occur in the rotating liquid body disturbing the flow pattern, in turn resulting in decreased efficiency. Due to the passage of the rotating liquid to and through the central outlet, a substantial part of the supplied kinetic energy will be lost as a consequence of friction losses. This occurs because the leaving overflow can have only a rotational energy corresponding to the rotational velocity and the cross-section of inertia of the overflow.

The angular velocity of the overflow to and through the central opening cannot be greater than the velocity of the liquid in the remaining part of the cyclone, as the liquid would be exchanged with the liquid in surrounding layers, and hence cause a large secondary flow. Such a secondary flow is also one of the major deficiencies of prior art cyclones with a central outlet.

Another deficiency of prior art cyclones resides in their use of one or more tubular, elongated inlets with gradually reduced cross-sectional area. Since the liquid velocity in the inlets will be high by optimum utilization of the cyclone, the pressure during drop across the inlets will be high, due to friction against the wall in the inlet ducts. The pressure drop across the inlet or inlets and also the pressure drop across the cyclone will increase substantially with increasing viscosity.

This energy loss reduces the rotational velocity and thereby the separating efficiency of the cyclone in respect to the inlet pressure. At high inlet velocity, the inlet diameter must be reduced, and for viscous liquids this can result in substantial losses. Cyclones with only one inlet will result in an uneven flow in the cyclone, a phenomenon which is known from SF-PS No. 75 3027, in which long, curved inlet ducts with a tapered cross-section are shown.

From other prior art, in which high liquid pressure energy is converted into kinetic energy with a minimum loss, for instance in Pelton turbines, an entirely different construction of the nozzle is used. Such technique is also known from drilling mud nozzles in drill heads used in drilling for oil, since such short nozzles give the optimum efficiency.

The present cyclone separator or hydrocyclone differs inter alia from the prior art in that the inlets are designed with a short nozzle, the bore of which is less than the bore in front of and behind the nozzle.

In order to understand the present invention more fully, reference is directed to the accompanying Drawings which are to be taken in conjunction with the following detailed description of the invention and in which Drawings.

Figure 1:
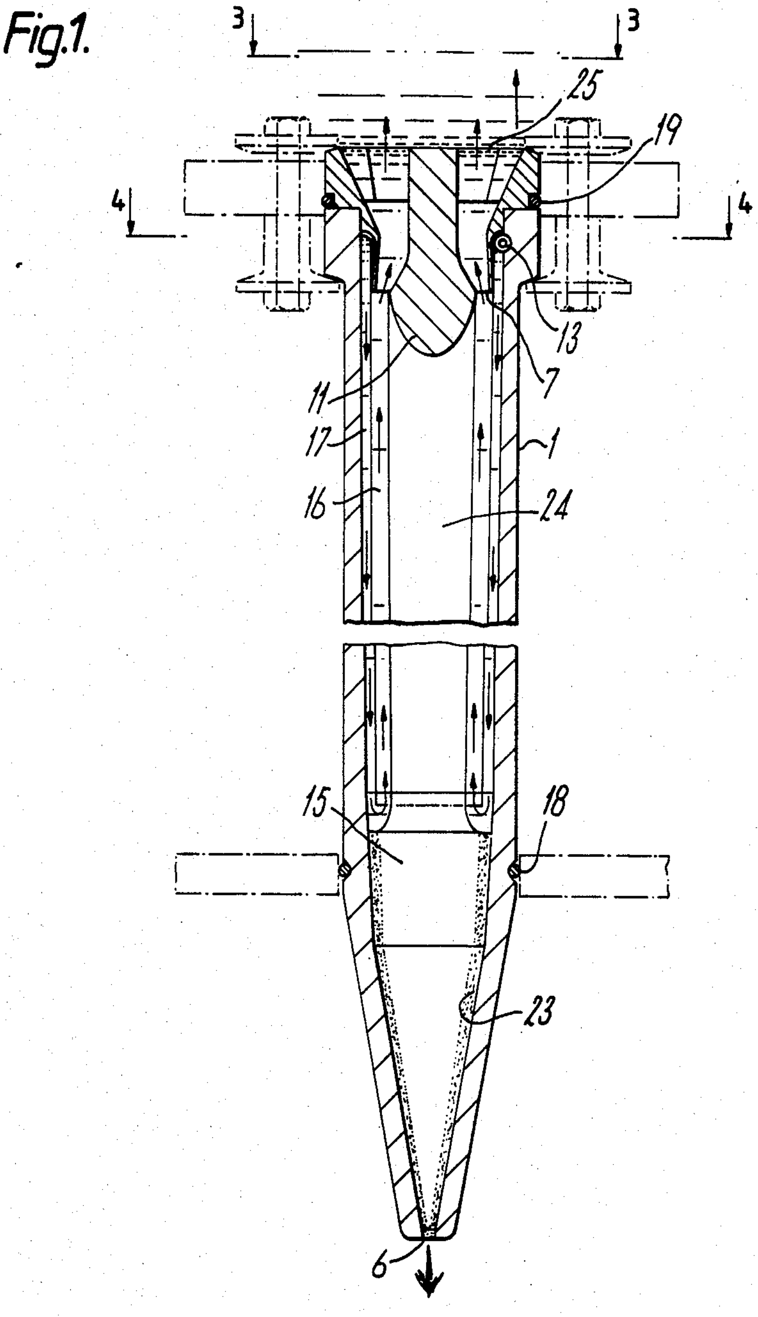
FIG. 1 is a sectional view in elevation of a hydrocyclone in accordance with the invention.
Figure 2:
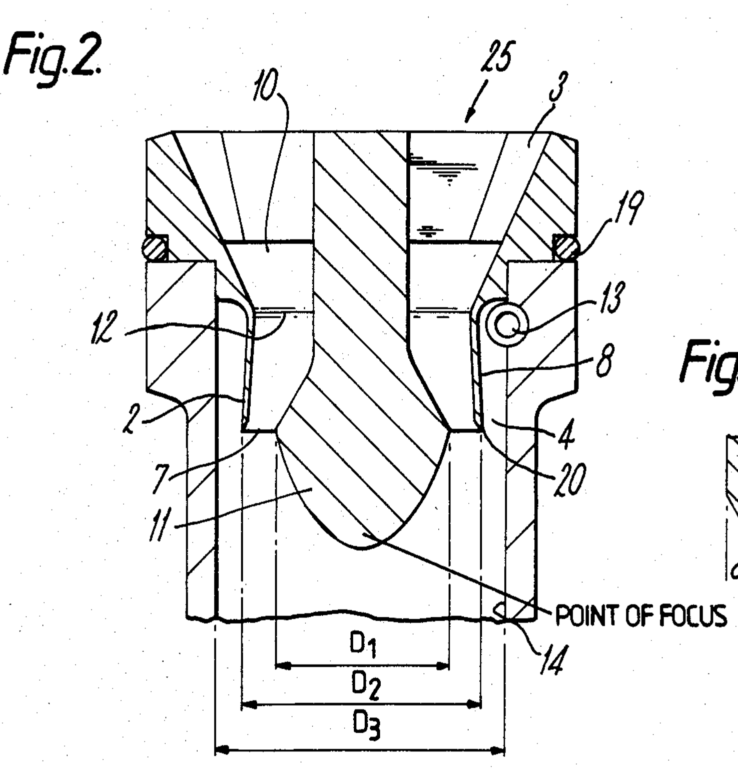
FIG. 2 is an exploded view in elevation of the inlet/-outlet portion of the hydrocyclone illustrated in FIG. 1.

Generally, in accordance with this invention, a cyclone separator or hydrocyclone for separating solid particles from a liquid, and as may be seen in the accompanying Drawings, comprises a sustantially cylindrical or slightly conical hollow body 1, the lower part of which, at least internally, is conically tapered and terminates in an opening 6 for discharge of liquid enriched with respect to solid particles, and wherein the upper end of the hollow body is provided with at least one inlet opening 5 and an annular outlet 7 for purified liquid, the inlet 5 being provided with a short nozzle 13, and the diameter of the inlet in front of nozzle 13 having a bore larger or equal to two times and bore A of nozzle 13, while the diameter B of the channel behind nozzle 13 is at least 1.3 times the bore A of the nozzle, and the length D of nozzle 13 is not larger than the diameter thereof, the radius of curvature E of the nozzle being less than 1.5 times and greater than 0.75 times the diameter A of the nozzle, and the annular outlet 7 is defined between a centrally arranged body 11 and an annular guiding tube 2 having an external diameter $D_2$ which, in respect to the inner diameter $D_3$ of the cyclone is in the range of 0.72 and 0.83.

The nozzle 13 can be made from a different and substantially more wear resistant material, for instance hard metal, than the remaining parts of the cyclone, thereby reducing wear even at high velocities and with a large number of particles in the inlet.

In order to obtain an optimum inlet duct, the thickness D of the nozzle 13 must not exceed the diameter A in this section. The radius of curvature E of the nozzle 13 must not exceed $0.75\times A$, and be less than $1.5\times A$. The bore of the channel 5 in front of the nozzle 13 must have a section with a diameter C larger than $2\times A$, and the bore of the channel 21 behind the nozzle, leading into the cyclone, must have a diameter B of at least $1.35\times A$ in order that a liquid layer shall not be formed in the channel behind the nozzle before the liquid jet has reached the vortex forming chamber 4. The short nozzle 13 will result in a parallel directed jet of a diameter less than the diameter of the subsequent channel 21, hence friction against the wall in the channel 21 is avoided. The differential pressure across the hydrocyclone will thus be less viscosity dependent than for known cyclones.

By adjusting the diameter A of the nozzle 13, the capacity and the rate of separation for the cyclone may be adjusted simply by replacing the nozzles in the same manner as the capacity of a pump may be adjusted by altering the diameter of the impeller.

Figure 4:
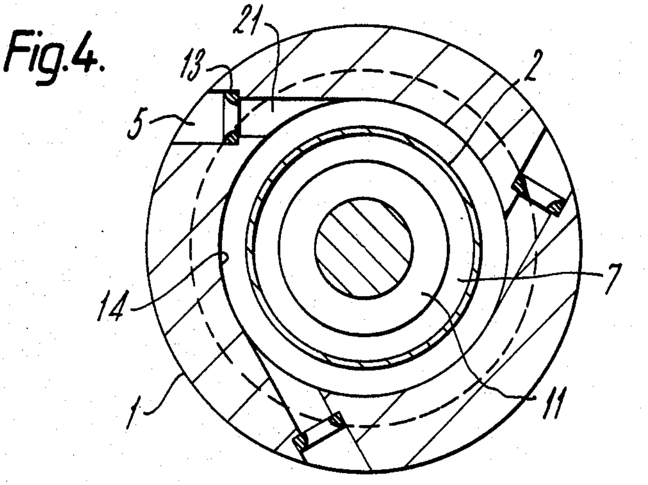
FIG. 4 is a plan view in section of the hydrocyclone shown in FIG. 1 taken across line 4—4 of FIG. 1 and showing three inlets for introducing the liquid to be purified.
Figure 5:
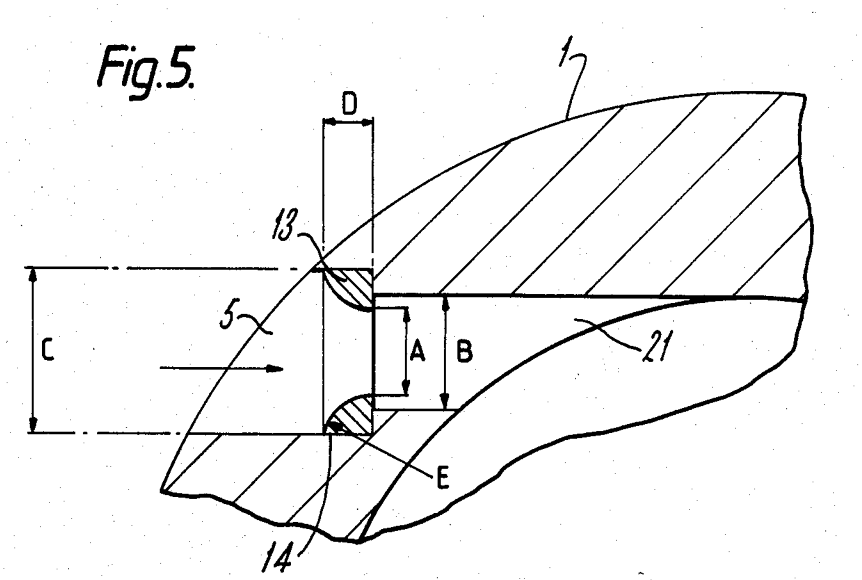
FIG. 5 is a partial exploded view of one of the inlets shown in FIG. 4.

Between the guiding tube 2 and the inner part or wall 14 of the cylindrical body 1, a vortex forming chamber 4 is formed, into which the inlets for the liquids to be purified are introduced via the nozzles 13, as shown in FIG. 4. As apparent from FIG. 4, the inlets are tangentially directed in respect to the inner wall 14 of the cylindrical body 1, such that introduced liquid is forced to rotate in the chamber 4, whereas the purified or accept liquid is discharged via the annular chamber or outlet 7 to the conical chamber 12, and further via the conical portion 10 and the rotation preventing portion 3.

In using the hydrocyclone according to the invention, the liquid to be treated is pressure injected through the inlet nozzles 13, which are made from a wear resistant material. Preferably the nozzles 13 are directed with a sloping angle such that the jets are lined side by side along the circumference.

The introduced liquid is brought to a vigorous rotation in the chamber of outlet 4 and forms a downward cylindrically rotating layer 17 in contact with the inner wall 14. The liquid flows down along wall 14 until the rotating liquid is forced into the more conical portion 15, in which the liquid in the usual manner reverts and rotates upwards in a cylindrical layer 16, as indicated with arrows, and out via the annular chamber 7.

The outer portion of the guiding tube 2 will, when the downward cylindrically rotating layer leaves the vortex forming chamber 4, smooth the surface of the rotating layer. In order that the outer wall 8 of the guiding tube 2 contributes as little as possible to the friction in the liquid and vortex formation, the guiding tube 2 is conically designed with a conicity of a minimum of 4° and a maximum of 10°. A part of the liquid 23 being enriched with respect to solids will be slowed down against the inner wall 14, and hence does not possess sufficient rotational energy to be recarried upwards in the cyclone, and will consequently be carried against the apex of the cyclone and discharged via the lower outlet 6.

The elongated part 1 of the cyclone separator has over a major part of its length a conicity which, with respect to the rotational velocity, only compensates for frictional loss against the inner wall 14. As mentioned, the lower part of the cyclone separator has a conical form 15 with a conicity such that invertion is effected, and the rotating liquid is carried upwards as a layer 16 towards chamber on outlet 7 and within the layer 17 which is moving downwards in the direction of the outlet 6.

It is within this part of the path through the separator that the separation mainly takes place, as in this region an absolute minimum of flow disturbance exists because the downward moving layer 17 rotates in the same direction and with the same velocity, and because a cylindrical air column 24 constitutes the surface of the layer 16. The air column 24 is kept centrally in place in the cyclone by parabolic shaped center stem 11 in order that the thickness of the layer 16 and hence the sedimentation distance shall be at a minimum. In common cyclones with a liquid filled center there will exist a liquid connection with small gravitational forces between the reject and accept liquid portions, and a "leakage" of particles from the reject liquid portion to the accept liquid portion will take place. This phenomenon is prevented by air column 24.

The centrally arranged center stem 11 must have a parabolic form in order that the liquid in the center of the cyclone during the starting up of the same shall disappear from the central portion during the building-up of the air column 24. If the body 11 is of a different shape, a part of the liquid in the center of the cyclone flowing in the direction of the overflow, will flow back to the central portion of the cyclone and be mixed with gas in the central portion, such that the building-up of the stable air column 24 centrally in the cyclone will not take place.

The length of the substantially cylindrical part 1 is determined by the desired residence time in that part of the flow path, since in this part a minimum flow disturbance will occur. In the outlet section 25 the purified rotating liquid is at first introduced into a section 12 with a cross-section giving minor alternations in the axial velocity, and thereafter into a section with increasing cross-sectional area 10, in which both the axial velocity and the rotational velocity are reduced and the remaining kinetic energy is converted into pressure energy.

Finally, the purified liquid is introduced into a section with a rotation preventing device 3, in which the cross-section 10 is further increased. The flow of purified liquid will be axially directed and attain a reduced absolute velocity.

The kinetic energy thus will be converted into pressure energy, which effectively may be utilized for further transport of the purified liquid. In order to obtain the best possible results, the ratio between the diameters of the ascending layer 16, the descending layer 17 and the air column 24 must lie within well-defined values. Such values are not common for cyclones with several inlets.

In practice this means that: $0.72D_3 \leqq D_2 \leqq 0.83D_3$.

In order to obtain equilibrium between the ascending and the descending layers, optimum particle separation, and to recover as much energy as possible, the diameter of the paraboloid 11 may be:

$$0.4D_3 \leqq D_1 \leqq 0.6D_3,$$

and the focal length $a_1$ of the paraboloid 11 must be:

$$0.06D_1 \leqq a_1 \leqq 0.1D_1.$$

These ratios are not previously used or known from prior cyclones.

Figure 6:
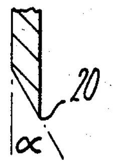
FIG. 6 is a partial exploded view of the internal structure of a hydrocyclone according to the invention as illustrated in FIG. 2 and showing the lower sharp edge of the guiding tube.
Figure 3:
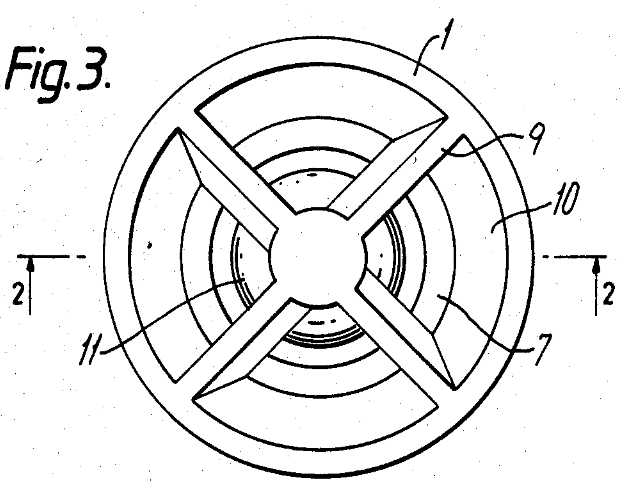
FIG. 3 is a plan view of the hydrocyclone shown in FIG. 1 and taken across line 3—3 of FIG. 1.

As shown in FIG. 6, the guiding tube 2 is tapered with a lower sharp edge 20 with an angle $\alpha$ in order not to form whirling at the outlet. The angle $\alpha$ of said tapering must be $$25° \leqq d \leqq 35°,$$

and the thickness must be $$0.02D_3 \leqq e \leqq 0.04D_3.$$

In relation to prior art hydrocyclones, a smaller pressure drop over the cyclone is obtained, and it is equally effective at large absolute pressures, such that for several purposes no auxiliary pumps are necessary for an optional subsequent treatment of the purified liquid.

Tests have shown that, compared with conventional hydrocyclones, the present hydrocyclone, under equal conditions, will remove particles of a size down to 2–3 μm, whereas conventional hydrocyclones will separate particles down to 7–8 μm by equal cyclone diameter and pressure drop. However, the flow through the present cyclone will be twice that of a conventional cyclone with the same inlet diameter and the same internal diameter.

In total, the present cyclone exhibits substantially improved properties. Enclosed performance data for particles in sea water are shown.

The number of particles in the shown ranges was determined by means of a "Coulter Counter TAIL" using a known cyclone using a cyclone of the present invention, with a diameter of approximately 7.6 cm.

The capacity of each cyclone was 150 l/min with a pressure drop of 2.1 bar.

Coulter Counter TAII

Liquid: Sea water
Place: NUTEC, Bergen

| Particle diameter μm | Known cyclone Number of particles per ml | Inventive cyclone Number of particles per ml | Efficiency % Percentage of particles removed | Accumulated percentage greater than |
|---|---|---|---|---|
| 1.0–1.25 | 22436 | 17072 | 23.9 | 75.4 |
| 1.25–1.6 | 10578 | 8095 | 23.5 | 76.7 |
| 1.6–2.0 | 6268 | 4357 | 30.5 | 78.1 |
| 2.0–2.5 | 4651 | 2971 | 36.1 | 79.5 |
| 2.5–3.2 | 2765 | 1529 | 44.7 | 81.6 |
| 3.2–4.0 | 1727 | 759 | 56.1 | 83.8 |
| 4.0–5.1 | 1084 | 299 | 72.4 | 86.0 |
| 5.1–6.4 | 707 | 107 | 84.9 | 87.6 |
| 6.4–8.0 | 423 | 58 | 86.3 | 88.1 |
| 8.0–10.1 | 233 | 26 | 88.8 | 88.6 |
| 10.1–12.7 | 100 | 9 | 91.0 | 88.5 |
| 12.7–16.0 | 39 | 6 | 84.6 | 87.1 |
| 16.0–20.2 | 19 | 3 | 81.2 | 88.8 |
| 20.2–25.2 | 2 | 0 | 100.0 | 100.0 |
| 25.2–32 | 1 | 0 | 100.0 | 100.0 |

We claim:

1. Cyclone separator or hydrocyclone for separation of solid particles from a liquid comprising a substantially cylindrical hollow body having a lower portion which is conically tapered and terminates in an opening for discharge of liquid enriched with respect to solid particles, the upper end of said hollow body being provided with at least one inlet opening having a bore and an annular outlet for purified liquid, said inlet opening being provided with a short nozzle having a bore (A), the diameter of the bore of said inlet opening in front of said nozzle being larger or equal to twice the diameter of the bore (a) of said nozzle, the diameter (B) of the bore of said inlet opening behind said nozzle being at least 1.3 times the diameter of the bore (A) of said nozzle, the length (D) of said nozzle not exceeding the diameter (A) thereof and the length of curvature (E) of said nozzle being less than 1.5 times and larger than 0.75 times the diameter (A) of said nozzle, and said annular outlet being defined between a centrally disposed body and an annular guiding tube located in the upper end of said hollow body, said annular guiding tube having an external diameter ($D_2$) in the range of 0.72 ($D_3$) and 0.83 ($D_3$) in respect to the inner diameter ($D_3$) of said cyclone separator.

2. A cyclone separator or hydrocyclone according to claim 1 wherein the cylindrical hollow body is slightly conical.

3. A cyclone separator or hydrocyclone according to claim 2 wherein the lower part of the cylindrical hollow body is internally conically tapered.

4. A cyclone separator or hydrocyclone according to claim 1 wherein the lower part of the cylindrical hollow body is internally conically tapered.

5. A cyclone separator or hydrocyclone according to claim 1 wherein the centrally disposed body has the form of a paraboloid having a diameter ($D_1$) in the range of 0.4 ($D_3$) and 0.6 ($D_3$) in respect to the inner diameter ($D_3$) of said cyclone separator.

6. A cyclone separator or hydrocyclone according to claim 1 wherein the centrally disposed body has a focal distance which is greater than 0.06 ($D_1$) and less than 0.1 ($D_1$).

7. A cyclone separator or hydrocyclone according to claim 1 wherein the annular guiding tube is conically shaped, having a conicity in a range of 4° to 10°, and has a larger diameter inside the cylindrical hollow body.

8. A cyclone separator or hydrocyclone according to claim 1 wherein the annular guiding tube is provided with a lower sharp angular edge in which the angle $\alpha$ is in a range of 25° and 35°.

9. A cyclone separator hydrocyclone according to claim 1 wherein the angular guiding tube has a wall thickness in a range of 0.02 ($D_3$) and 0.04 ($D_3$).

* * * * *